United States Patent [19]
Ikegame

[11] Patent Number: 6,046,866
[45] Date of Patent: Apr. 4, 2000

[54] OPTICAL ELEMENT SUPPORTING APPARATUS

[75] Inventor: Tetsuo Ikegame, Hachioji, Japan

[73] Assignee: Olympus Optical Co., Ltd., Tokyo, Japan

[21] Appl. No.: 09/236,505

[22] Filed: Jan. 25, 1999

[30] Foreign Application Priority Data

Jan. 27, 1998 [JP] Japan ................................. 10-013970

[51] Int. Cl.$^7$ ................................................ G02B 7/02
[52] U.S. Cl. .................. 359/823; 359/813; 359/822; 359/199; 369/112; 369/44.14
[58] Field of Search .................. 359/823, 822, 359/199, 213, 224, 813; 369/112, 117, 44.14, 44.15, 44.16, 44.17

[56] References Cited

U.S. PATENT DOCUMENTS 5,208,703  5/1993  Ikegame et al. ........................ 359/813
5,428,473  6/1995  Takizawa et al. ...................... 359/199

*Primary Examiner*—Georgia Epps
*Assistant Examiner*—Saeed Seyrafi
*Attorney, Agent, or Firm*—Frishauf, Holtz, Goodman, Langer & Chick, P.C.

[57] ABSTRACT

A terminal portion as a plate-like attachment portion is formed on a spring made of a plate material supporting a movable member. These portions are molded integrally at the center plane of the fixed member. Deformation due to temperature changes or external forces is prevented by bending rigidity in the surface direction of the terminal portion. This deformation is arranged to be symmetrical deformation with respect to the center plane as a center, which is the terminal portion. In this manner, the rigidity of the movable member is increased to prevent deformation and to improve the precision.

9 Claims, 9 Drawing Sheets

OPTICAL ELEMENT SUPPORTING APPARATUS

BACKGROUND OF THE INVENTION

The present invention relates to a supporting apparatus for an objective lens used in an optical apparatus such as an optical scanner or the like or used in a data recording/reproducing apparatus which records/writes data with respect to an optical recording medium such as an optical disk drive, postscript type disk drive, phase change disk drive, CD-ROM, DVD, optical card, or the like, and also relates to a supporting apparatus for an optical element such as a galvano mirror or the like.

Conventionally, an optical element internally having a movable part or a movably supported optical element is used in various optical devices as described above. For example, in an optical element of an optical element such as a galvano mirror, an optical element such as an internal mirror or the like is supported to be rotatable and another optical element such as an objective lens which enables focus control is supported to be movable in a predetermined direction.

In many cases, a supporting apparatus based on a spring has been conventionally used as an apparatus for movably supporting an optical component or element of a small size. This type of supporting apparatus supports a movable part by a spring, and the movable part is supported to be freely rotatable about a predetermined axis or movable freely in a predetermined direction by deformation of the spring. An example of a conventional supporting apparatus of this type is disclosed in Japanese Patent Application KOKAI Publication No. 7-93783.

FIGS. 17 and 18 show a schematic structure of a conventional supporting apparatus such as a mirror supporting apparatus for a galvano mirror. In the figures, the reference 201 denotes a fixing member in a fixed side, which is formed by injection molding of a synthetic resin material or the like, for example. Further, a concave portion 203 is formed at the center portion of the fixing member 201, and a movable member 202 is supported on the concave portion 203 to be rotatable and movable, for example. Further, a mirror or the like (not shown) is attached to this movable member 202.

This supporting apparatus is provided with a spring 204 for supporting the movable member 202. This spring 204 is integrally formed from a thin plate material made of a spring material and comprises a frame-like fixed-side attachment portion 205 and a movable-side attachment portion 206. This movable-side attachment portion 206 is integrally connected by linear spring portions 207 having a narrow width. Further, the fixed-side attachment portion 205 described above is attached on the upper surface of a fixing member 201, for example, by screws or the like, and the movable member 202 is attached to the movable-side attachment portion 206.

The movable member 202 described above is supported to be rotatable by twisting deformation of the spring portions 207. In addition, since the spring portions 207 can be bent to be deformed, the movable member is also supported to be movable in the vertical direction.

The conventional supporting apparatus exemplified above has a drawback as follows. That is, preferably, the spring 204 described above has a small size as a whole and the spring portion 204 is also deformed with a spring coefficient which is as small as possible. It is therefore formed of a thin plate material. Consequently, the fixed-side attachment portion 205 and the like of this spring 204 can be easily deformed and are deformed by an external force caused by tightening the attachment screws or by thermal deformation of the fixing member 201 and the like. This deformation influences the spring constant of the spring portion 207 and affects the support precision and the support characteristic for the movable member 202.

In particular, the fixing member 201 described above is formed of a synthetic resin material so that the thermal expansion coefficient is relatively large. The spring 204 is formed of a metal material such as a beryllium-copper alloy or the like so that the thermal expansion coefficient is relatively small. Therefore, the fixed-side attachment portion 205 or the like made of a thin plate material is easily deformed due to a difference between the thermal expansion coeffeicients of both components, so that the precision of the galvano mirror is lowered.

In addition, the fixing member 201 is made of a synthetic resin material as described above, and the synthetic resin material generally has a small elastic coefficient. Therefore, the fixing member 201 is easily deformed by an external force such as tightening of screws during assembly, so that the deformation affects the support precision and the support characteristic of the fixing member 201. Therefore, the dimensions of respective parts of the fixing member must be enlarged so that the rigidity of respective parts is increased, in order to prevent undesired deformation of the fixing member 201. In this manner, a drawback appears in that the optical element such as a galvano mirror or the like has an enlarged size.

BRIEF SUMMARY OF THE INVENTION

The present invention has been made on the basis of the above situation and provides a supporting apparatus for a movable part of an optical system in which a movable member is supported by a spring made of a thin plate material, so that deformation of the spring, the fixed member, or the like is prevented to improve the support precision and the support characteristic and the size of the apparatus can be reduce.

To achieve the above object, the supporting apparatus according to the present invention is a supporting apparatus for a movable portion of an optical system, comprising a fixed member, a movable member to which at least an optical element or component is attached, and a support mechanism for supporting the movable member such that the movable member can be displace with respect to the fixed member, wherein the support mechanism comprises a spring formed by forming a plate material into a predetermined shape, and the spring includes a spring portion which can be deformed to support movably or rotatably the movable member, a movable-side attachment portion formed to be continuous to an end portion of the spring, and a plate-like fixed-side reinforcement portion formed to be continuous to another end portion of the spring portion, and wherein the movable-side attachment portion is attached to the movable member, and the movable-side attachment portion is arranged along a substantial center plane of the movable member and is attached to be integral with the movable member.

Accordingly, the integrated movable-side reinforcement portion reinforces the movable member thereby to increase the rigidity thereof and to prevent undesired deformation. Therefore, it is possible to prevent deterioration of the support precision and the support characteristic of the spring due to such undesired deformation, and the size of the movable member can be reduced to be small.

Also, since the plate-like movable-side reinforcement portion is arranged along the substantial center plane of the movable member, the movable member has a symmetrical structure. Therefore, when the fixed member is deformed due to a temperature change or an external force, deformation of the movable-side reinforcement member is reduced to be small and the support precision and the support characteristic can be improved, since deformation becomes symmetric with respect to the movable-side reinforcement portion at the center plane as a center and the movable-side reinforcement member is provided at the center plane which is the center of determination, even if the movable-side reinforcement portion and the movable member are respectively made of materials such as metal and synthetic material having different characteristics concerning thermal expansion coefficients, elastic coefficients, and the like. In addition, if the movable member is formed of a synthetic material, deformation due to contraction after injection-molding becomes symmetrical and the precision can be improved as described above since the movable-side reinforcement portion is provided at the center plane when injection-molding the resin material.

Also, according to a preferred embodiment, the fixed member is of a cantilever type, and the fixed-side reinforcement portion has an elongated shape elongated along a lengthwise direction of the fixed member and is arranged along the substantial center plane of the fixed member.

Therefore, this fixed member reduces deformation like the movable member described above, and the precision is improved. In addition, this cantilever type fixed member leads to low rigidity and deformation due to temperature changes and external forces is large. However, the rigidity is increased and deformation is prevented by the fixed-side reinforcement portion, so that the precision can be improved.

Also, according to a preferred embodiment, the fixed member is of a frame type, and the fixed-side reinforcement portion has a frame-like shape and is arranged along the substantial center plane of the fixed member.

Therefore, this fixed member reduces deformation, like the movable member described above, and the precision is improved. In addition, this frame-like fixed member has high rigidity and deformation due to temperature changes and external forces is relatively small. However, the rigidity is much more increased and deformation is much more prevented by the fixed-side reinforcement portion, so that the precision can be improved much more.

Also, according to a preferred embodiment, the fixed member is formed of a synthetic resin material, and the fixed-side reinforcement portion is arranged along the substantial center plane of the fixed member and is molded integrally in the fixed member. Therefore, the fixed member is strong and has a small size, and steps of assembly or the like can be reduced.

Also, according to a preferred embodiment, the fixed member is constructed by a pair of fixed-member halves which fit each other on the substantial center plane of the fixed member, and the fixed-side reinforcement portion is clamped between the fixed-member halves to be integrally attached to the fixed-side halves. Therefore, the material of the fixed member is not restricted, so that the fixed member is finished with high precision and much higher precision can be achieved.

Also, according to a preferred embodiment, a through hole is formed in the fixed-side reinforcement portion, and a synthetic resin material is filled in these through holes, thereby connecting portions of the fixed member positioned in both sides of the fixed-side reinforcement portion, in the above-described apparatus in which the fixed member is made of a synthetic resin material. Therefore, this fixed-side reinforcement member and the fixed member can be securely and strongly integrated.

Also, according to a preferred embodiment, at least a part of an edge portion of the fixed-side reinforcement portion is projected from a side surface of the fixed member, and the projected edge portion is clamped and pressed between fitting surfaces of metal molds for injection-molding the fixed member, in the above-described apparatus in which the fixed member is made of a synthetic resin material. Therefore, when the synthetic resin material is injected into the metal molds, the fixed-side reinforcement portion in the metal molds is not displaced, so that the position precision of the fixed-side reinforcement portion is improved.

Also, according to a preferred embodiment, a connection rib arranged over the projected edge portion of the fixed-side reinforcement portion and connecting integrally portions of the fixed member in both sides of the fixed-side reinforcement portion is provided to be projected from the side surface of the fixed member, in the above-described apparatus in which the fixed member is made of a synthetic resin material. Therefore, the portions of the fixed members in both sides of the reinforcement portion can be connected without forming a through hole in the fixed-side reinforcement portion, so that the rigidity or strength of the fixed-side reinforcement portion is not lowered.

BRIEF DESCRIPTION OF THE SEVERAL VIEWS OF THE DRAWING

The present invention will be understood more clearly from the drawings below integrated as a part in the present specification, the explanation above in the brief summary of the invention, and the detailed description of preferred embodiments described later.

DETAILED DESCRIPTION OF THE INVENTION

In the following, a first embodiment of the present invention will be explained with reference to FIGS. 1 to 12. In this embodiment, the present invention is applied to a an apparatus for supporting a movable section of a galvano mirror used in a light pick-up device in a data recording/reproducing apparatus using a magneto-optical disk as a recording medium.

Figure 1:
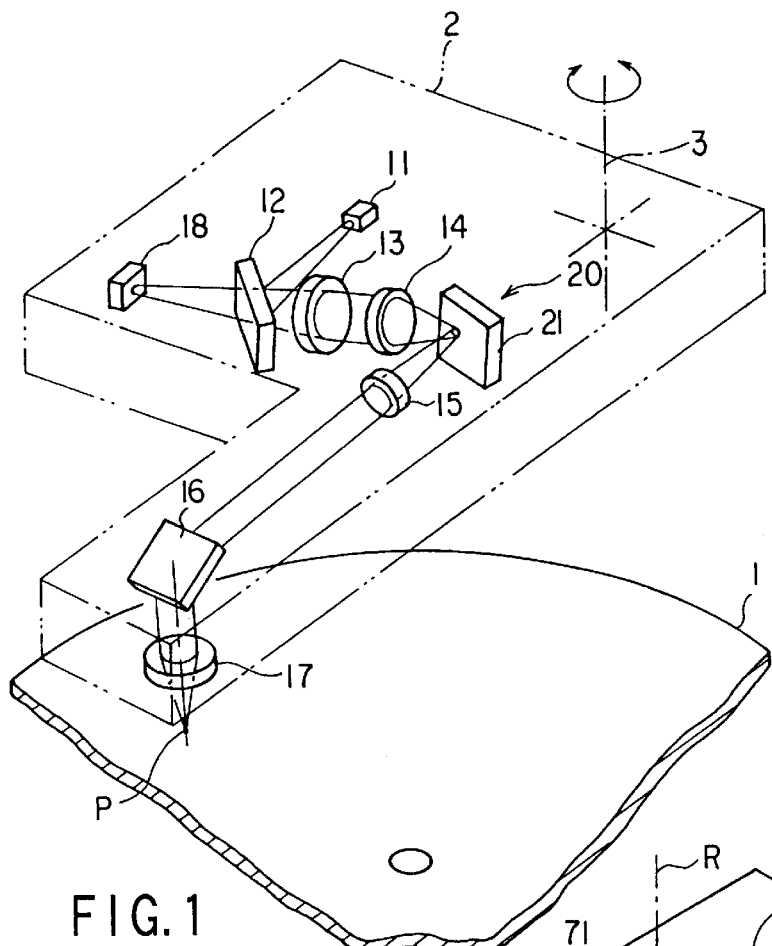
FIG. 1 is a schematic perspective view showing the structure of a light pick-up apparatus according to a first embodiment of the present invention.

Firstly, the schematic layout of the optical element in the light pick-up device will be explained with reference to FIG. 1. In FIG. 1, the reference 1 denotes a magneto-optical disk, and an arm-like carriage 2 is provided along the recording surface of the magneto-optical disk 1. In the carriage 2, an optical system described later is provided, and a light spot P is formed on the recording surface of the magneto-optical disk 1 by the optical system, to perform writing and reading of data.

The carriage 2 described above is rotated by a drive mechanism not shown about a rotation axis 3 as a center, and the top end portion thereof is mechanically moved to make coarse access. In addition, the optical system is provided with a galvano mirror 20 described later, and the spot P is optically moved to make fine tracking.

Although no specific structure is shown in the figure, the carriage 2 described above is formed by die-cast molding of magnesium alloy or molding of plastics, and the above optical system is included internally therein. Note that the carriage 2 may be formed by die-cast molding of aluminum alloy or molding of plastics such as polyphenylene sulfide (PPS), liquid crystal plastics (LCP), polyether imide (PEI) or the like, other than the die-cast of magnesium alloy described above.

This optical system comprises a laser diode 11 as a light source, and a part of light emitted therefrom is reflected on the surface of a beam splitter 12. The reflection light therefrom enters into a collimator lens 13 and becomes parallel light. Further, the parallel light is converged by a relay lens 14. Also, this optical system is provided with a galvano mirror 20 described later. The light converged by the relay lens 14 is reflected at a position before the focus position thereof by a mirror 21 of the galvano mirror 20, and is changed into parallel light again by a conversion lens 15. The parallel light travels in the arm portion of the carriage 2 along the lengthwise direction thereof, and is reflected by a fixed mirror provided at the top end portion of the arm portion. The reflection light enters into an objective lens 17 and focuses the light spot P described above, on the recording surface of the magneto-optical disk 1.

In addition, a part of returning light from the recording surface of the magneto-optical disk 1 is transmitted through the beam splitter 12 and enters into a photo-detector 18. Further, a signal such as a data reproducing signal, focusing error signal, tracking error signal, or the like is obtained by an output from this photo-detector 18. For example, the focusing error signal and tracking error signal are supplied to a control circuit (not shown) of the light pick-up device. By a control signal from the control circuit, the mirror 21 of the galvano mirror 20 is rotated about the mirror rotation shaft thereby to move the position of the light spot P in the tracking direction so that fine tracking described above is carried out. Also, by the control signal from the control circuit, the relay lens 14 is rotated in its optical axis direction by a drive mechanism not shown thereby to make focusing control of the light spot P on the magneto-optical disk 1.

Note that, in the present embodiment, every of the light paths from the laser diode 11 to the fixed mirror and to the photo-detector 18 is arranged in the plane parallel to the rotation plane of the carriage 2.

Figure 2:
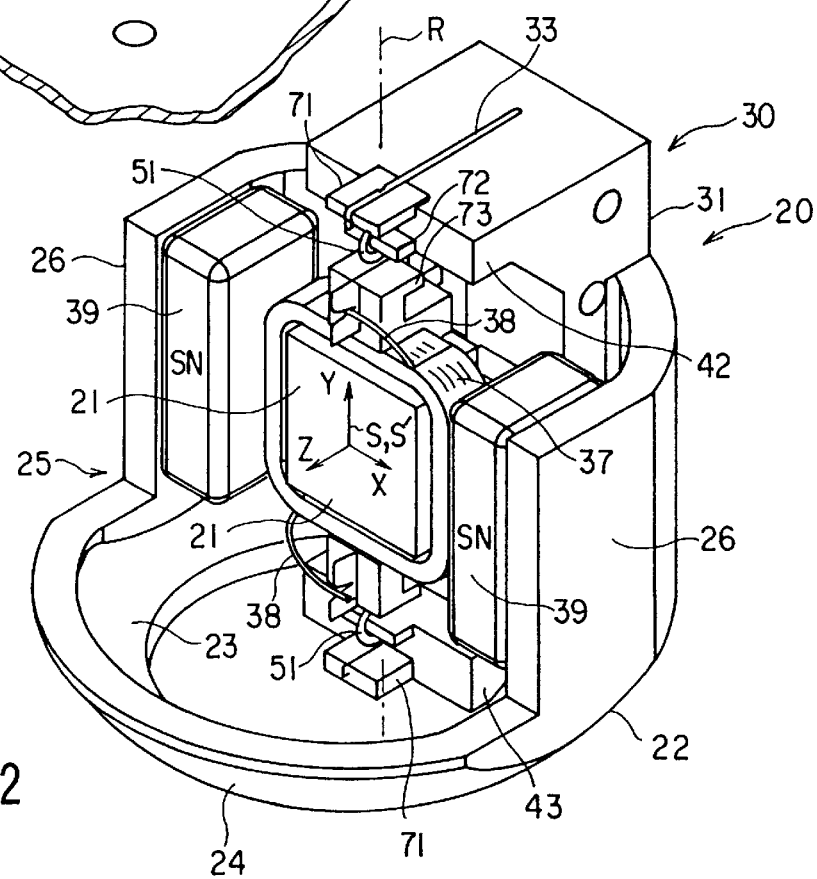
FIG. 2 is a perspective view of a galvano mirror according to the first embodiment, viewed from the front side.
Figure 3:
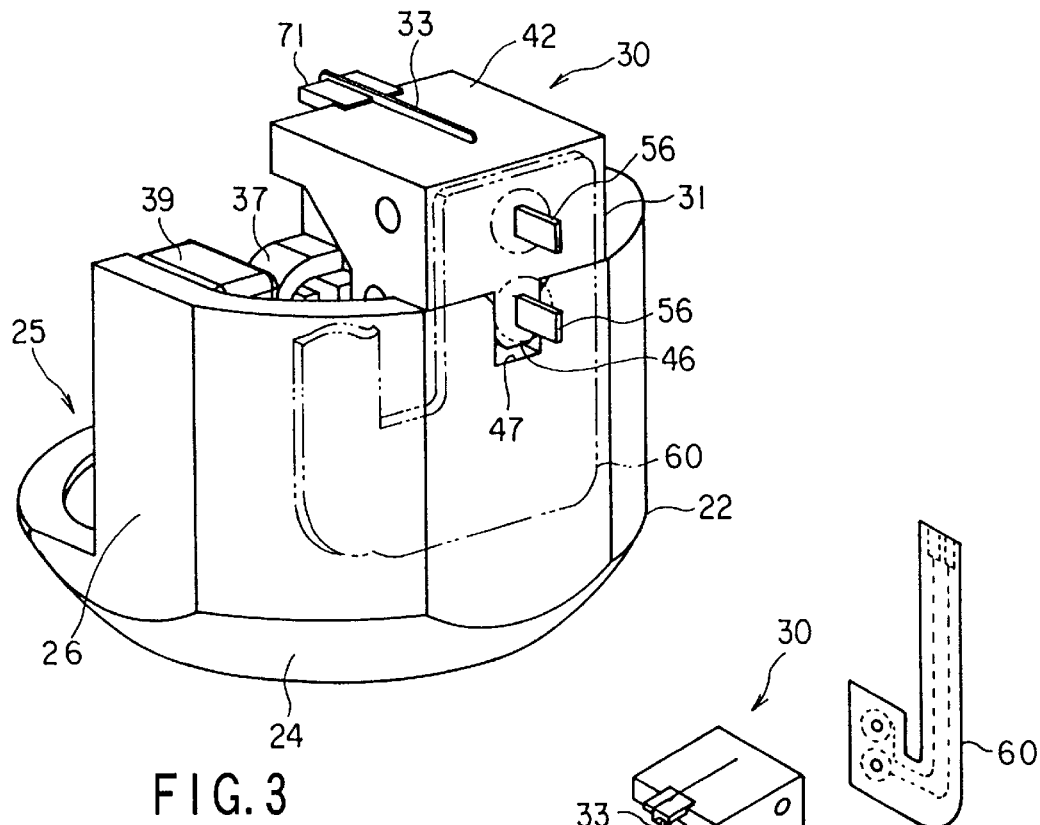
FIG. 3 is a perspective view of the galvano mirror according to the first embodiment, viewed from the rear side.
Figure 4:
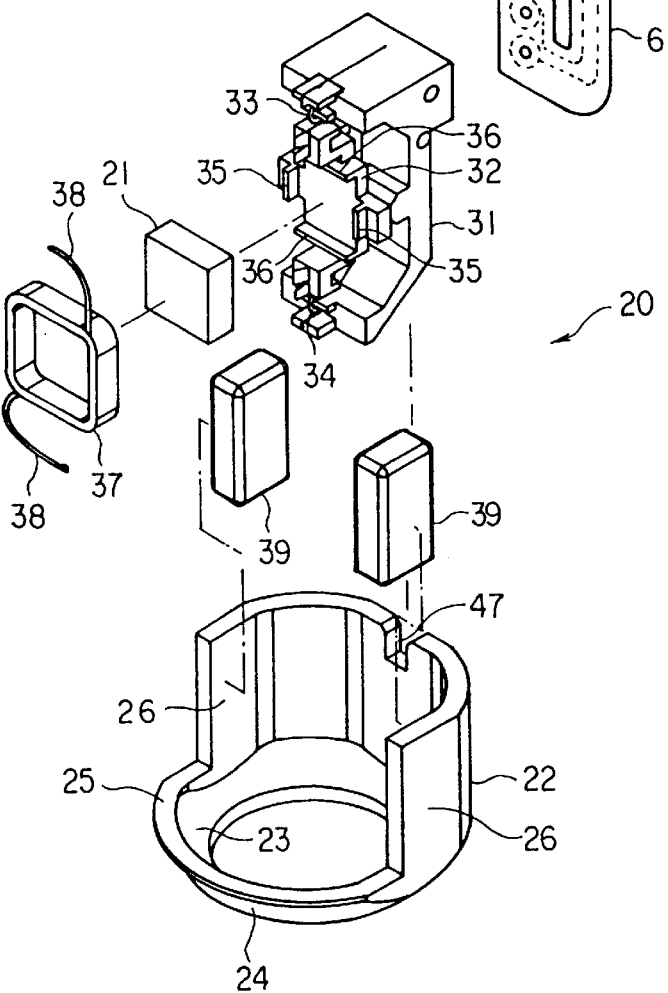
FIG. 4 is an exploded perspective view of the galvano mirror according to the first embodiment.

Next, explanation will be made of the structure of the galvano mirror 20 used in the light pick-up device of the present embodiment. FIG. 2 is a perspective view of the galvano mirror of this embodiment viewed from the front side, FIG. 3 is a perspective view thereof from the backside, and FIG. 4 is an exploded perspective view thereof.

In the figure, the reference 22 denotes a base member, and this base member 22 is formed by press-molding a steel plate material and has a substantially cylindrical shape having a bottom, as a whole. A hole is formed in the center portion of the bottom wall portion 23 of the base member 22 thereby forming a ring-like shape, and the lower surface of the bottom wall portion 23 is formed to be spherical as a supporting surface 24 for installing and adjusting the galvano mirror. The center of the supporting surface 24 corresponds to the position 0 of the light axis of the entering light on the reflection surface of the mirror 21. Among the circumferential walls of the base member 22, the front surface side of the mirror 21 is notched so that a light path opening 25 is formed for passing light.

Figure 11:
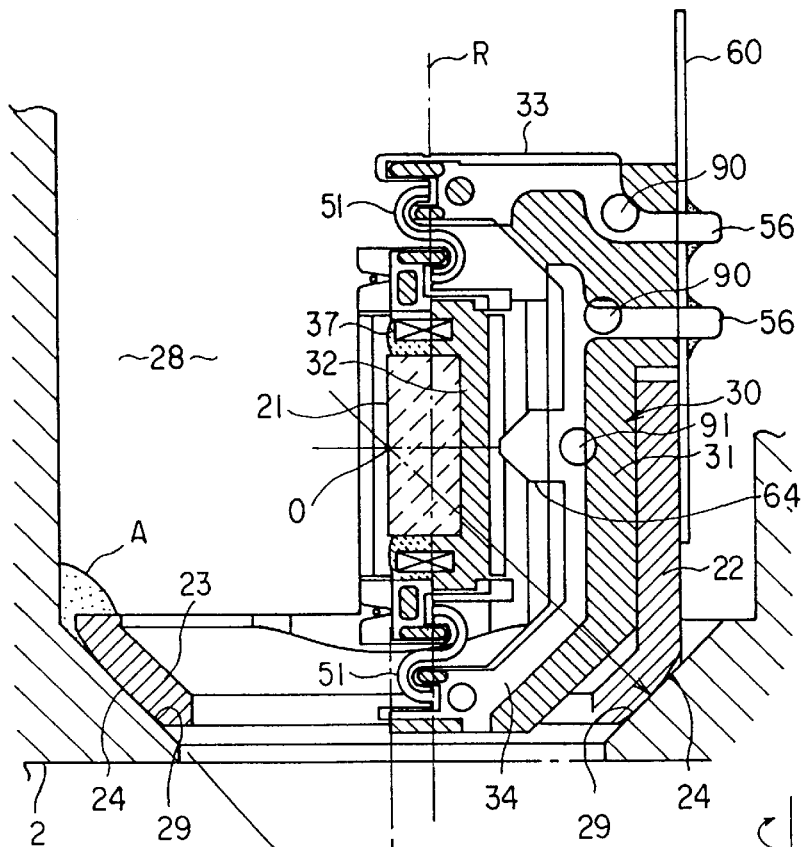
FIG. 11 is a longitudinal sectional view of a galvano mirror container section and a galvano mirror contained therein.
Figures 12, 14:
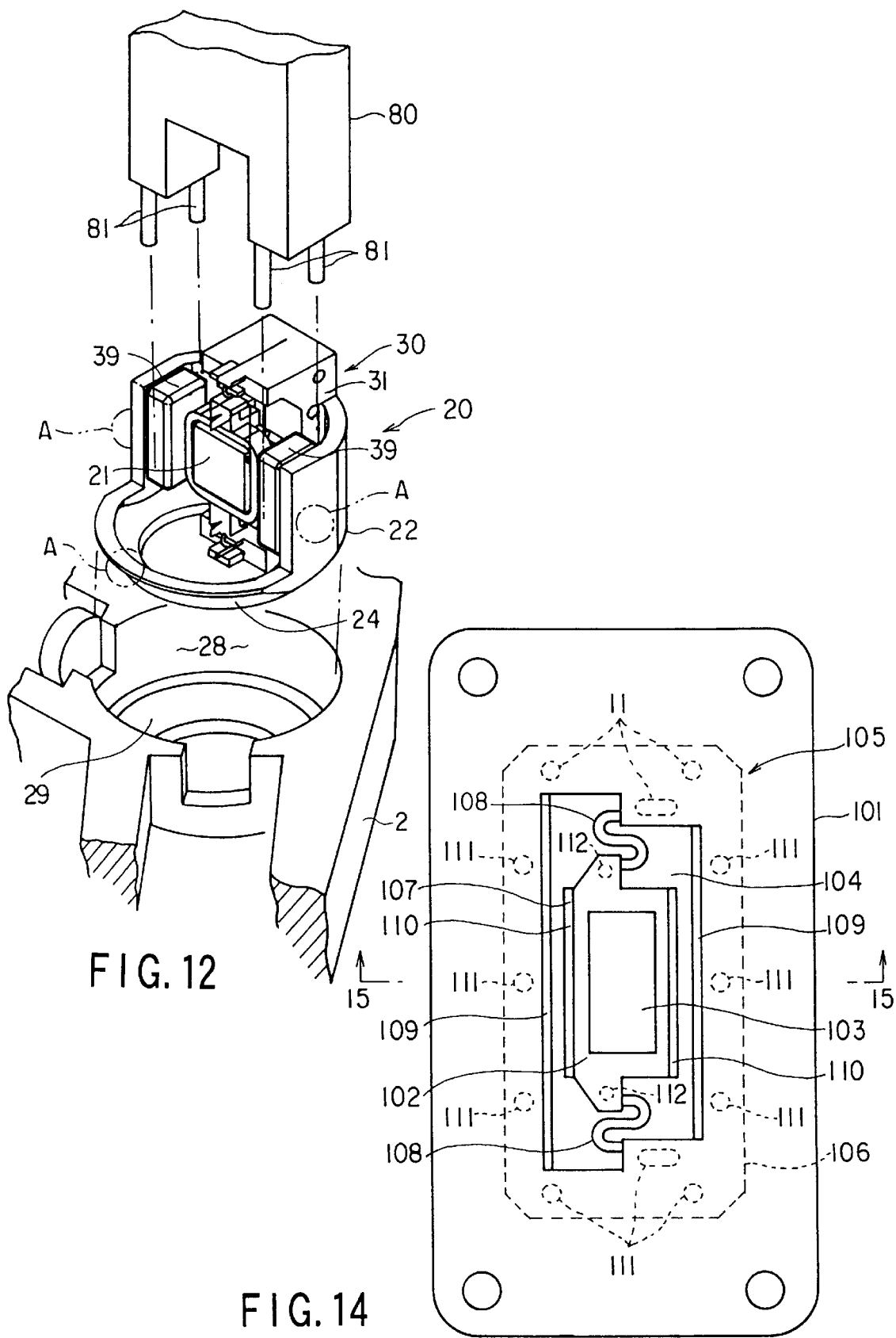
FIG. 12 is an exploded perspective view showing an installation state of a galvano mirror.
FIG. 14 is a side view of a supporting apparatus according to a third embodiment.

The galvano mirror 20 as described above is contained in a galvano mirror container section 28 formed in the carriage 2, as shown in FIGS. 11 and 12. This galvano mirror container section 28 has a shape substantially corresponding to the outer shape of the galvano mirror 20 as described above, i.e., a circular concave portion. The galvano mirror container section 28 is opened in the direction vertical to the plane where the light paths in the carriage 2 are provided, e.g., toward the upside. The opening direction of the galvano container section 28 is also the leaving direction when the carriage is subjected to die-cast molding with a metal mold.

Further, a ring-like bearing seat surface 29 is formed on the bottom portion of the galvano mirror container section 28. The bearing seat surface 29 is integrally formed when the carriage 2 is molded by die-casting, and has a shape like a conical surface. Further, the galvano mirror 20 inserted in the galvano mirror container section 28 is adjusted about its inclination, with the supporting surface 24 at the bottom kept in contact with the bearing seat surface 29, and is fixed at a predetermined position.

The center axis S of the supporting surface 24 of the galvano mirror 20 and the center axis S' of the bearing seat surface 29 are each arranged in parallel with the mirror rotation axis R as the rotation center axis of the mirror 21. In addition, the center axes S and S' of these supporting surface 24 and the bearing seat surface 29 are included in the reflection surface of the mirror 21 and are arranged so as to pass the position of the optical axis of the entering light on the reflection surface.

Further, a spring assembly 30 is contained in the base member 22. This spring assembly 30 is comprised of a fixing member 31 as a member in the fixed side, which is made of synthetic resin material in a cantilever-like shape, and a movable member 32 as a member in the movable side, which is made of also synthetic material and is supported to be rotatable in the front side of the fixed member 31. The movable member 32 is supported to be rotatable about the mirror rotation axis R parallel to the Y axis as shown in FIG. 2 by springs 33 and 34 described later.

Also, a mirror 21 is attached to the front surface of the movable member 32, and a substantially rectangular movable coil 37 is equipped so as to surround the mirror 21. A movable section is formed by the movable member 32, mirror 21, and the movable coil 37. The light paths of the entering light and reflection light which enter into the mirror 21 are arranged in a plane which includes the X-axis and Y-axis in FIG. 2. The mirror rotation axis R described above is parallel to the Y-axis as described above and passes the gravity center point of the entire movable section consisting of the movable member 32, mirror 21, and movable coil 37. The mirror rotation axis R corresponds to the main axis of inertia of the movable section.

Note that total four projections consisting of a pair of left and right positioning projecting portions 35 and a pair of upper and lower positioning projecting portions 36 are integrally projected on the front surface of the movable member 32. Further, the left and right side surfaces and the upper and lower surfaces of the mirror 21 are engaged on the inner surfaces of the positioning projecting portions 35 and 36, and the mirror 21 is positioned at a predetermined position on the front surface of the movable member 32. In addition, the movable coil 37 has left, right, upper, and lower inner circumferential surfaces engaged on the outer surfaces of the positioning projecting portions 35 and 36, and the movable coil is positioned at a predetermined position. Therefore, the positioning projecting portions 35 and 36 are interposed between the outer circumference of the mirror 21 and the inner circumference of the movable coil 37, and a predetermined clearance is formed therebetween.

Further, the movable member 32, mirror 21, and movable coil 37 are integrally adhered to each other by an adhesive material filled in the clearance. Accordingly, the movable section consisting of these components have a rectangular block-like shape as a whole and is also integrally joined to each other by an adhesive material. Therefore, the oscillation frequency inherent to the movable section is very high, and resonance generated when the movable section rotates is securely prevented.

Note that the fixed member 31 and the movable member 32 are formed of a non-conductive synthetic resin material reinforced by glass fibers, such as liquid crystal plastics (LCP), polyphenylene sulfide (PPS), polyether imide (PEI), polycarbonate (PC). In addition, the mirror 21 described above is obtained by forming a reflection film having a high reflection ratio, on a flat glass substrate. The movable coil 37 is obtained by winding a lead wire having a diameter 0.05 mm into four layers, and lead lines 38 are respectively led upper and lower portions thereof. Note that the power supply structure for the movable coil 37 will be described later.

In addition, the plan shape of the spring assembly 30 described above is substantially rectangular as described above, and this spring assembly 30 is inserted in the cylindrical base member 22 thereby forming spaces in both sides of the spring assembly 30. Note that an engaging projecting portion 46 is formed on the back surface of the fixed member 31 of the spring assembly 30, as shown in FIG. 3. In correspondence with the engaging projecting portion 46 described above, an engaging concave portion 47 is formed at the upper edge portion of the circumferential wall portion of the base member 22 in the back surface side thereof. Further, the engaging projecting portion 46 is engaged in the engaging concave portion 47, and the assembly is thereby positioned and engaged in the base member 22.

In addition, in the spaces in both sides of the spring assembly 30, fixed permanent magnets 39 each having a substantially rectangular block-like shape are respectively contained with their different poles opposed to each other. Those portions of the circumferential walls of the base member 32 that contain the permanent magnets 39 are formed on the flat surface portions 26 and are thus constructed so as to contain stably the permanent magnets 39.

The plan shape of the base member 33 is substantially circular, and the plan shape of each the spring assembly 30 and the permanent magnets 39 is rectangular. Therefore, since these components are contained and engaged in the base member 22, clearances are respectively formed in the rear side of the permanent magnets 39. These clearances are used as clearances where a positioning pin of a fitting tool is inserted when the galvano mirror 20 is adjusted and attached as will be described later.

Figure 5:
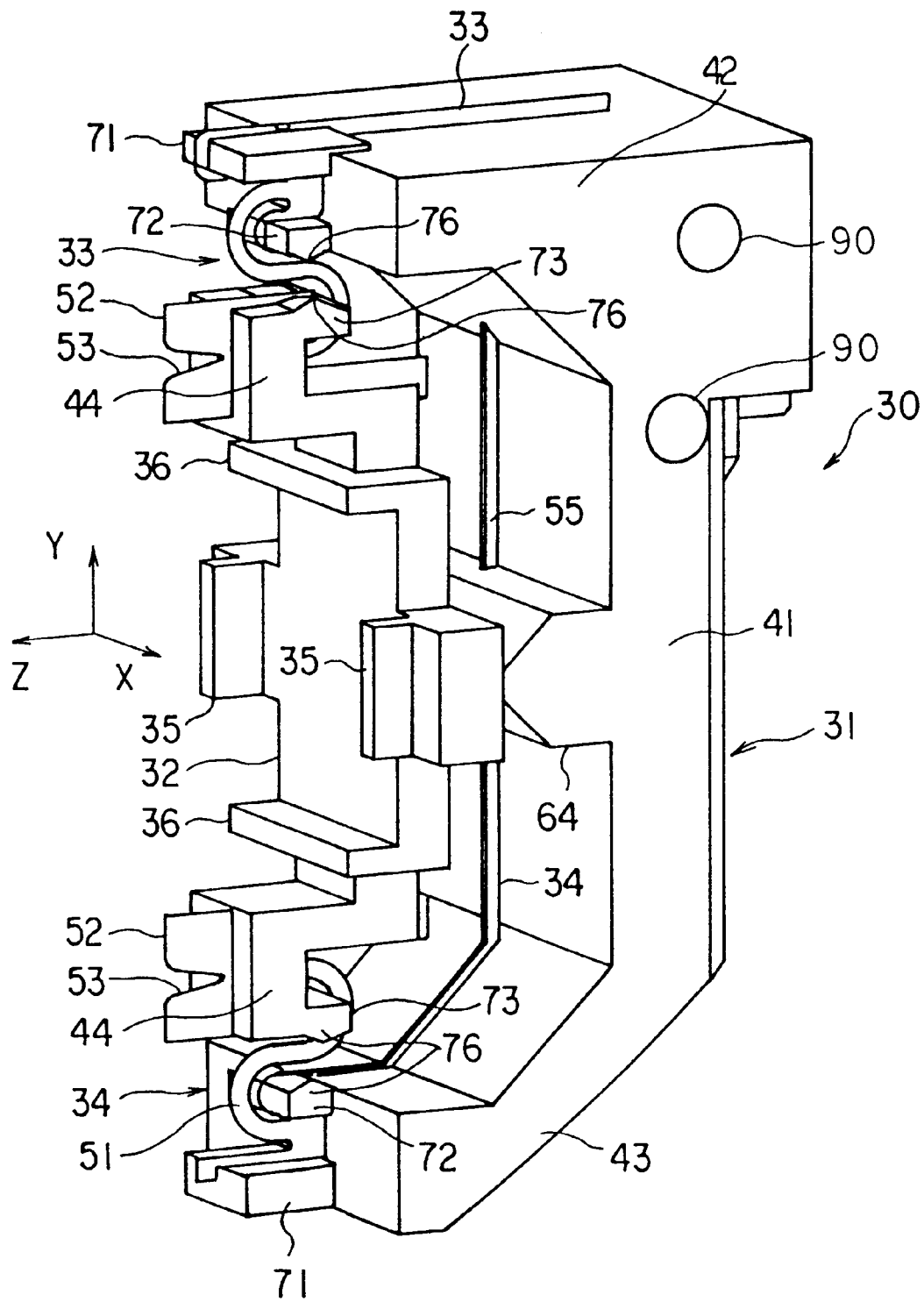
FIG. 5 is a perspective view of a spring assembly of the galvano mirror according to the first embodiment.

Next, explanation will be made of an apparatus for supporting the spring assembly 30 and the movable member 32. FIG. 5 shows a perspective view of the spring assembly 30. The fixed member 31 described above has a beam-like beam portion 41 and arm portions 42 and 43 projecting from the upper and lower end portions of the beam portion 41. Spring attachment portions 44 are formed to be projected integrally from the upper and lower end portions of the movable member 32, respectively. The arm portions 42 and 43 and the spring attachment portions 44 are jointed to be rotatable about the mirror rotation axis R described above. The joint structure of the springs 33, 34, fixed member 31, and movable member 32 is arranged as follows.

Figure 6:
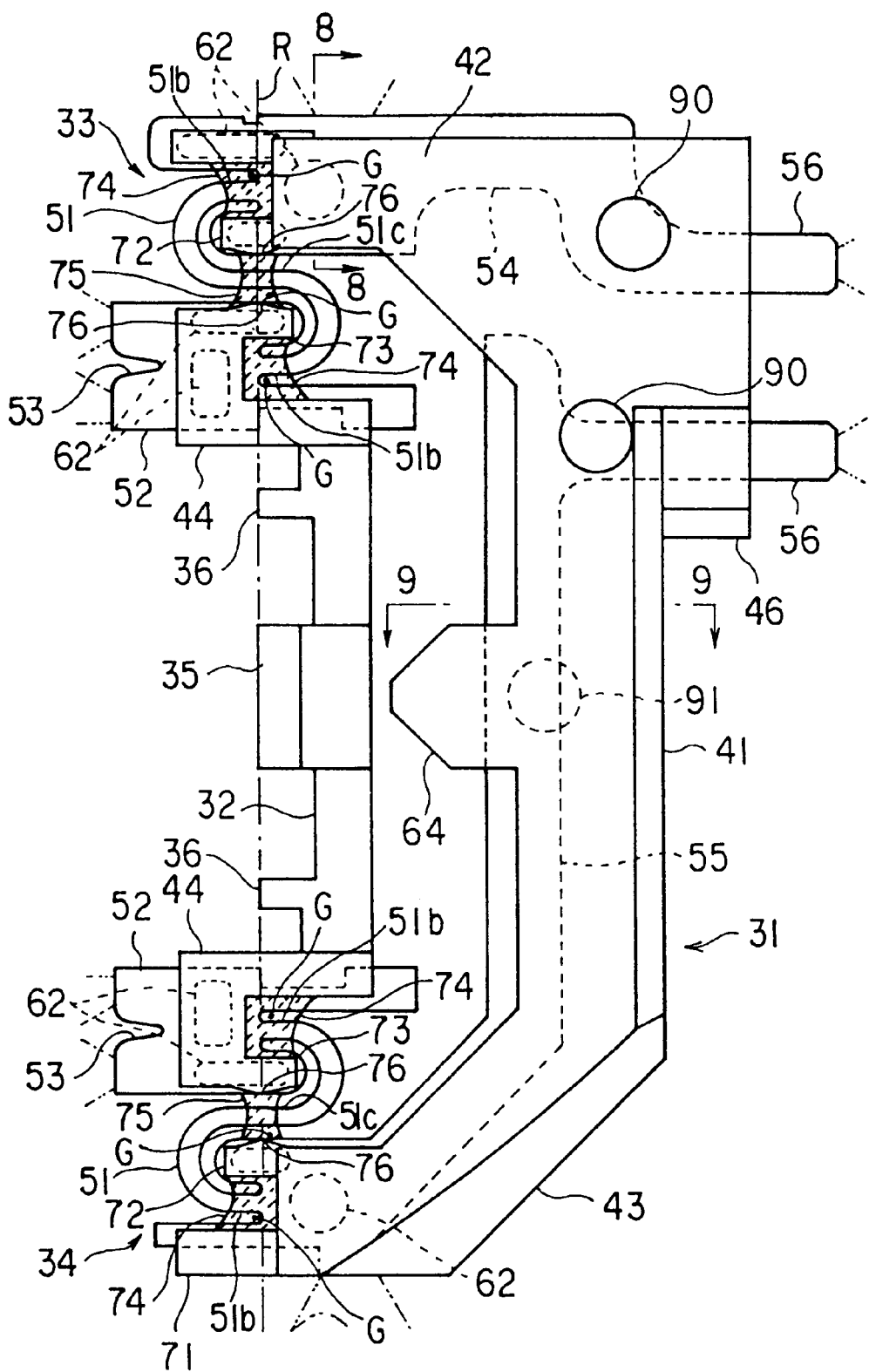
FIG. 6 is a schematic side view of the spring assembly of the galvano mirror according to the first embodiment.
Figure 7:
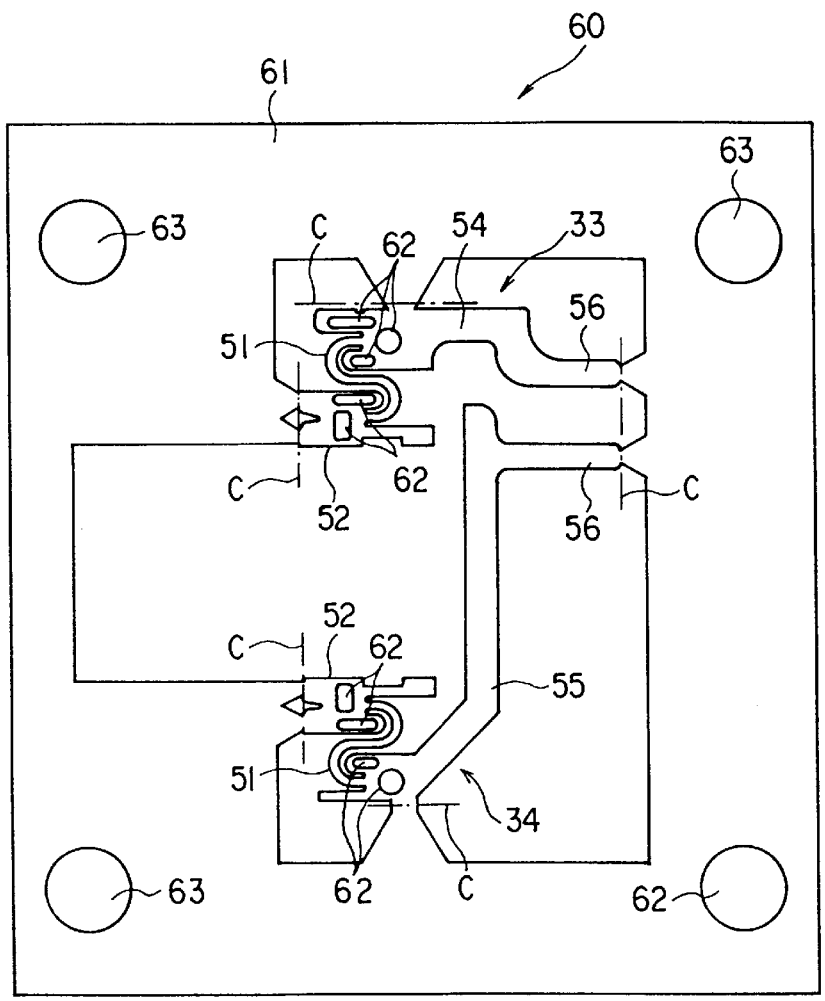
FIG. 7 is a plan view of a blank material of a spring according to the first embodiment.

FIG. 6 shows the shapes of the springs 33 and 34 and the layout relationship between the fixed member 31 and the movable member 32. FIG. 7 shows a state of a rapped blank material before the springs 33 and 34 are incorporated in the fixed member 31 and movable member 32. These springs 33 and 34 also serve as members for rotatably supporting the movable member 32, reinforcement members for reinforcing the fixed member 31 and the like, and conductive members for supplying power to the movable coil 37 described above.

These springs 33 and 34 are obtained by processing thin plate materials of, for example, beryllium-copper alloy having a thickness of 0.03 mm into predetermined shapes by etching or the like, and gold plating is performed on the surfaces thereof to improve the corrosion resistant characteristic and soldering characteristic. Further, these springs 33 and 34 each include, for example, an S-shaped spring portion 51 curved in an S-shape, a terminal portion 52 formed to be continuous to an end portion of the S-shaped spring portion, reinforcement conductive portions 54 and 55, and a terminal portion 56 formed at the top end portions of the reinforcement conductive portions 54 and 55. V-shaped engaging notches 53 engaged with a lead line 38 of the movable coil 37 are respectively formed in the top end portions of the terminal portions 52 described above. The reinforcement conductive portion 55 of the lower spring 34 is formed to be substantially L-shaped.

The springs 33 and 34 are arranged in parallel with the Y-Z plane in FIGS. 2 and 5, and the terminal portion 52 and the reinforcement conductive portions 54 and 55 are embedded to be integral with the center surface and the symmetrical surface of the fixed member 31 and the movable member 32. The reinforcement conductive members 54 and 55 are metal plate materials and have high rigidity against bending and shearing deformation in the surface direction. Therefore, since these materials are embedded integrally in the beam portion 41 and the arm portions 42 and 43 in the fixed member 31, the rigidity of these parts is increased, thereby preventing deformation due to loads and deformation due to thermal expansion according to temperature changes, so that the precision of the spring assembly 30 is increased. In addition, since the terminal portion and the reinforcement conductive portions 54 and 55 are embedded in the center planes of the fixed member 31 and the movable members 32, the spring assembly 30 is laterally symmetrical with respect to the center plane, so that irregular deformation is more efficiently prevented and the precision is more improved.

As for the upper spring 33, the terminal portion 52 is integrally embedded in the spring attachment portion in the upper side of the movable member 32, and the top end portion of the terminal portion 52 projects from the top end surface of the spring attachment portion 44. Further, one of the lead lines 38 of the movable coil 37 is engaged in the engaging notch 53 at the top end portion and further joined thereto by soldering. In addition, the reinforcement conductive portion 54 is integrally embedded in the upper arm portion of the soldering member 31. Further, the terminal portion 56 at the top end of the reinforcement conductive portion 54 projects through the back surface of the fixed member 31, as shown in FIG. 3. Further, as shown in FIGS. 3 and 11, a terminal portion of a printed wiring board 60 is soldered to the terminal portion 54. Therefore, power is supplied to the movable coil 37 through the printed wiring board 60, the reinforcement conductive portion 54 of the spring 33, the S-shaped spring portion 51, the terminal portion 52, and the lead line 38.

In addition, as for the lower spring 34, the terminal portion 52 thereof is embedded in the spring attachment portion 44 in the lower side of the movable member 32, and the engaging notch 53 is engaged with and soldered to the other lead line 38 of the movable coil 37. In addition, the L-shaped reinforcement conductive portion 55 of this spring 34 is integrally embedded continuously in the lower arm portion 43 and beam portion 41 of the fixed member 31. Further, the terminal 56 at the top end of the reinforcement conductive portion 55 projects through the back surface portion of the fixed member 31 and is soldered to the other terminal portion of the printed wiring board 60, in a similar manner as described above. Also, in a similar manner as described above, power is supplied to the movable coil 37 through these components.

This kind of spring assembly 30 is assembled in the following manner. Firstly, a thin plate material of beryllium-copper alloy or the like as described above is processed by etching to manufacture a blank material 60 of a spring as shown in FIG. 7. This blank material 60 has a frame-like frame portion 61, and springs 33 and 34 as described above are integrally in the frame portion 61, with a predetermined layout relationship. Note that these springs 33 and 34 and frame portion 61 continue along the portion of a cut plan line C along which cutting is carried out after assemble. Also, for example, at four corners of the frame portion 61, positioning holes 63 are respectively formed for positioning.

Further, this blank material 60 is interposed between a pair of metal molds (not shown) and these molds are matched with each other. A resin material is injected into the cavity of these molds to form the fixed member 31 and movable member 32. At the same time, the portion of the springs 33 and 34 are integrally embedded in the center plane as a matching interface of the molds of the fixed member 31 and the movable member 32.

Figure 8:
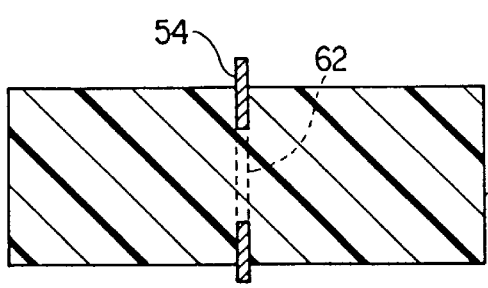
FIG. 8 is a cross-sectional view cut along a line 8—8 in FIG. 6.

Note that the adhesive force between the resin material and the springs 33 and 34 is very small so that the embedded springs 33 and 34 are not integrated but the fixed member 31 and the movable member 32 sometimes crack into the left and right sides at these portions. To prevent this, through holes 62 are formed in appropriate portions of the springs 33 and 34, and for example, as shown in FIG. 8, an injected resin material is filled into these holes so that the fixed member 31 and the left and light parts of the movable member 32 are joined together and the springs 33 and 34 are integrated.

Figure 9:
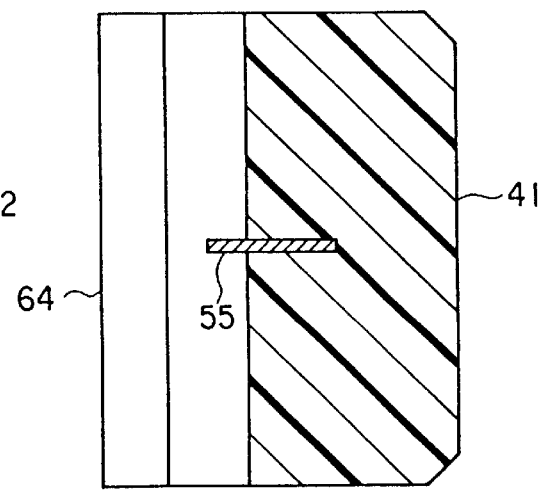
FIG. 9 is a cross-sectional view cut along a line 9—9 in FIG. 6.

In addition, when injecting a resin material into the cavity of the metal molds, respective parts of the springs 33 and 34 are deformed in the cavity by the injection pressure thereof, and the respective parts of the springs 33 and 34 are shifted from the center or deformed, in some cases. To prevent this drawback, the top end portion of the terminal portion 52, the edge portions of the reinforcement conductive portions 54 and 55, and the terminal portion 56 are clamped and pressed between the metal molds, thereby to prevent these portions from being shifted or deformed in the cavity. Accordingly, the portions clamped and pressed between the metal molds project from the surfaces of the fixed member 31 and the movable member 32, as shown in FIGS. 8 and 9.

Note that the reinforcement conductive portion 55 is embedded substantially over the whole length of the beam portion 41 of the fixed member 31, and the edge portion thereof projects substantially over the while length of the beam portion 41. Therefore, at the embedded portion where the reinforcement conductive portion 55 is embedded, the beam portion 41 is divided into left and right parts, and the strength and rigidity thereof are deteriorated. To prevent this drawback, through holes as described above are formed in the reinforcement conductive portion 55 and the left and right parts may be joined by the resin material filled in the through holes. However, if these through holes are formed, the strength and rigidity of the reinforcement conductive portion 55 are deteriorated. Therefore, at the center portion of the beam portion 41, a connection rib portion 64 is integrally projected in the direction crossing the beam. This connection rib portion 64 connects the left and right parts of the beam 41 together over the projecting edge portion of the reinforcement conductive portion 55. Therefore, the left and right parts of the beam 41 can be connected without forming through holes in the reinforcement conductive portion 55.

The connection rib portion 64 is opposed to the back surface of the movable member 32 and also serves as a stopper which restricts the maximum rotation angle of the movable member 32.

Further, after these springs 33 and 34 are integrally embedded in the fixed member 31 and the movable member 32, cutting is performed on the portion of the cut plan line, and the springs 33 and 34 are separated from the frame portion 61. The spring assembly is thus completed.

Next, the S-shaped spring portions 51 will be explained. These S-shaped spring portions 51 are arranged in parallel with the Y-Z plane in FIGS. 2 and 5 as described above and support the movable member 32 to be rotatable about the mirror rotation axis R parallel to the Y-axis in FIGS. 2 and 5 and also function to prevent the movable member 32 as much as possible in the directions other than that axis.

Figure 10:
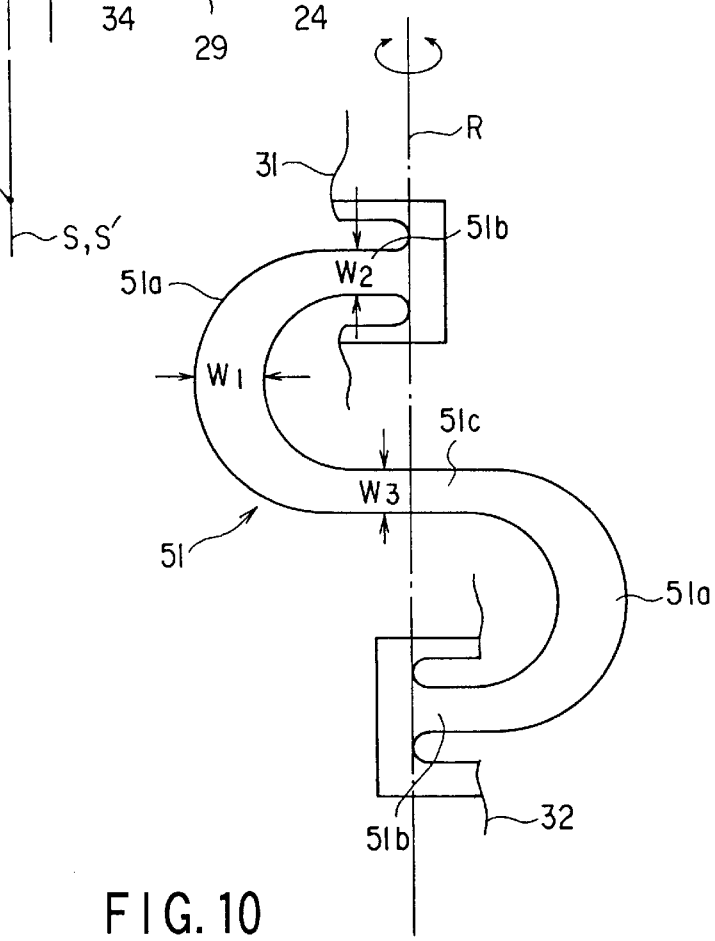
FIG. 10 is a schematic side view of a S-shaped spring portion of the spring.

FIG. 10 shows an enlarged view of the S-shaped spring portion 51, and a pair of substantially semi-circular curve portions 51a, end portions 51b thereof, and a substantially linear portion 51c which connects the other end portions of the curve portions 51a are integrally formed. Further, the end portions 51b described above are fixed in the side of fixed member 31 and in the side of the movable member 32.

The S-shaped spring portions 51 utilize the deformation characteristic of a thin plate to achieve the function as a support member as described above. In general, a thin plate material has a large dimension in the surface direction, relative to the thickness of the plate. Therefore, a thin plate material has the smallest rigidity with respect to simple bending deformation in the direction perpendicular to the surface direction, certainly high rigidity with respect to twisting deformation, and has the highest rigidity with respect to bending deformation or shearing deformation along both the directions. When the movable member 32 is rotated about the mirror rotation axis R in relation to the fixed member 31, simple bending deformation in the direction perpendicular to the surface direction is caused in the portions close of the mirror rotation axis R which means the base end portions of the end portions 51b and the center portion of the linear portion 51c of the S-shaped spring portion 51 although twisting deformation is caused at the portions apart from the axis R so that the twisting deformation becomes larger as the portions are more apart from the axis R. Consequently, simple bending deformation occurs concentrically at the portions close to the axis R, and the deformation amount is small at the portions apart from the axis R. Besides, the entire deformation of the S-shaped spring portion 51 is deformation symmetrical to the axis R as the center. Therefore, the S-shaped spring portion 51 supports the movable member 32 so as to rotate about the mirror rotation axis R so that the elastic force caused by the rotation about the mirror rotation axis is small.

Meanwhile, when the movable member 32 is moved to be inclined about the Y-axis direction, Z-axis direction, and X-axis direction, bending deformation and shearing deformation in the surface direction are caused in the S-shaped spring portion 51. The S-shaped spring portion 51 has high rigidity with respect to bending deformation and shearing deformation in the surface direction, as described above, and therefore, the supporting rigidity of the movable member 32 is high with respect to these directions. In particular, although movements in the Z-axis direction and inclination about the X-axis are caused by factors of optical errors such as a displacement of the light focus point of light reflected by the mirror 21 attached to the movable member 32 and an inclination of the optical axis, the supporting rigidity in these directions is high as described above so that these optical errors can be excluded effectively.

When the movable member 32 is moved in the direction of the X-axis and when it is inclined about the Z-axis, twisting deformation is caused at the end portions 51b and the linear portion 51c of the S-shaped spring portion 51 and simple deformation is caused at the center portions of the bending portions 51a, so that the rigidity is lowered relatively. The movement in these directions is simply a movement of the mirror 21 in the direction parallel to the reflection surface thereof and does not cause a substantial displacement of the reflection surface. Therefore, no optical error is caused.

Further, the S-shaped spring portion 51 is formed in a shape as described below in order that movement in the Z-axis direction, inclination about the Z-axis which are factors causing an optical error are reduced as much as possible, i.e., in order that the bending deformation and the shearing deformation of the S-shaped spring 51 in the surface direction are reduced as much as possible. As shown in FIG. 10, the S-shaped spring portion 51 is arranged such that the widths $W_2$ and $W_3$ of the end portions 51b and the linear portion 51c are narrow while the width $W_1$ of the curve portions 51a is wide. For example, in this embodiment, the widths $W_2$ and $W_3$ of the end portions 51b and the linear portion 51c are each set to 0.08 mm and the width $W_1$ of the curve portions 51a is set to 0.16 mm.

To increase the rigidity of the S-shaped spring portion 51 against bending deformation and shearing deformation, the widths of respective portions of the S-shaped spring portion 51 may be widened. However, if the widths are uniformly widened, the rigidity of the end portions 51b and the linear portion 51c against simple bending in the direction perpendicular to the surface direction is increased so that the rigidity against deformation about the mirror rotation axis R is increased. However, if the width $W_1$ of the curve portions 51a is widened as described above, the rigidity of the end portions 51b and the linear portion 51c against simple bending in the direction perpendicular to the surface direction is substantially unchanged but the rigidity of the curve portions 51a against bending deformation and shearing deformation in the surface direction thereof is increased. Meanwhile, when deformation about the mirror rotation axis R is caused as described above, the end portions 51b and the linear portion 51c close to the mirror rotation axis R are mainly bent and deformed while deformation is small at the curve portions 51a positioned apart from the axis R. Accordingly, increase of the rigidity about the mirror rotation axis R is slight in this case.

Since the S-shaped spring portion 51 described above functions as a member which ensures rotatable supporting about the mirror rotation axis R, it is preferred for the characteristic of this portion that the rigidity $G_Z$ against deformation in the other direction which is the Z-axis direction in FIG. 5 is larger than the rigidity $G_R$ against deformation about the axis R, i.e., $G_Z/G_R$ is as large as possible.

Next, explanation will be made of results of a test conducted to confirm the result as described above. In this case, since the above S-shaped spring portion 51 has a small size, it is difficult and inaccurate to measure directly the rigidity in the respective directions of the S-shaped spring portion 51. Taking into consideration this condition, the ratio of rigidity of $G_Z/G_R$ described above was indirectly measured in the following manner.

Firstly, as a comparative example, a spring having a plate thickness of 0.03 mm and a uniform width of 0.08 mm over the entire S-shaped spring portion was prepared, and a spring according to the embodiment as described above in which the end portions 51b and the linear portion 51c each had a width of 0.08 mm and the width W1 of the curve portion 51a was 0.16 mm prepared. These springs were integrated with same fixed members 31 and same movable members 32, and thus, spring assemblies 30 were prepared.

Further, natural frequencies of the movable member 32 in respective directions were measured. Firstly, with respect to the comparative example having a uniform width, the natural frequency $f_R$ of the movable member 32 about the mirror rotation axis and the natural frequency $f_Z$ of the movable member in the Z-axis direction were measured, and as a result, $f_R$=128 Hz and $f_Z$=718 Hz were obtained. Meanwhile, the natural frequencies were measured likewise with respect to the spring according to the embodiment, and as a result, $f_R$=159 Hz and $f_Z$=1414 Hz were obtained. Further, as a result of calculating the ratios of them, the comparative example having a uniform width had $f_Z/f_R$ of 5.6 while the spring according to the present embodiment had $f_Z/f_R$ of 8.9. Further, since the ratio of rigidity of the S-shaped spring portion is $(f_Z/f_R)^2$, the comparative example described above had $(f_Z/f_R)^2$ of about 31, i.e., the ratio of the rigidity about the mirror rotation axis and the rigidity in the Z-axis direction was about 31. In contrast, the spring according to the present embodiment had $G_Z/G_R$ of about 79. Accordingly, the $G_Z/G_R$ of the spring according to the present embodiment was as about 2.6 times high as that of the comparative example. Therefore, in the spring according to the present embodiment, the rigidity $G_Z$ in the Z-axis direction is about 2.6 higher than the comparative example if the rigidity $G_R$ about the mirror rotation axis R is set to be equal to that of the comparative example. That is, for example, the amount by which the movable portion 32 is moved due to resonance or oscillation is 1/2.6, i.e., the displacement of light reflected by the mirror 21 is 1/2.6. It is thus possible to obtain a galvano mirror with high accuracy and a stable tracking characteristic.

Also, as a form of the support member described above, the S-shaped spring 51 as described above is used. As for the spring as a support member for the galvano mirror 20, the effective length of the spring is preferably long in order to reduce the maximum stress which occurs at the support member thereby to improve the reliability of the support member. However, if it is elongated in the support member mirror rotation axis direction, the size of the galvano mirror 20 is very large and hinders downsizing of the apparatus. Therefore, in the present embodiment, the spring as a support member is formed in a S-shape and the spring length between the end portions 51b and 51b of the spring is elongated while the linear distance between the two end portions 51b and 51b.

Further, in the present embodiment, installation of the end portion 51b onto the fixed member 31 and installation of the end portion 51b to the movable member 32 are situated in the Z-direction as a direction vertical to the direction of the mirror rotation axis R. Therefore, the dimension in the mirror rotation axis R direction can be arranged to be very small including the attachment portion for the S-shaped spring 51 as a support member. Therefore, the reliability can be improved by reducing the dimension of the galvano mirror 20 in the mirror rotation axis R direction to reduce the power consumption and to reduce the maximum stress generated at the support member.

In addition, the movable member 32 is supported to be rotatable about the mirror rotation axis R by deformation of the S-shaped spring portions 51 of the springs 33 and 34. Since the S-shaped spring portion 51 has a predetermined spring constant with respect to deformation about the mirror rotation axis R, the movable member 32 oscillates about the mirror rotation axis R. Further, to damp such oscillation of the movable member 32, there is provided a damping mechanism as follows.

That is, as shown in FIGS. 5 to 6, upper and lower pairs of projecting portions 71 and 72 are respectively provided at the top end portions of the arm portions 42 and 43 of the fixed member 31, such that one end portion 51b of each spring portion 51 of the springs 33 and 34 is surrounded thereby. In addition, the spring attachment portions 44 of the movable member 32 are respectively provided with projecting portions 73, and the spring attachment portions 44 are formed like a U-shape such that the other end portions 51b of the S-shaped spring portions 51 are surrounded thereby. In addition, by the projecting portions 72 and 73 described above, the linear portion 51c of the S-shaped spring portion 51 is surrounded thereby.

Further, the concave portion formed between the projecting portions 71 and 72 and the clearance between the projecting portions 72 and 73 are filled with dumping materials 74 and 75, respectively. The end portions 51b of the S-shaped spring portions 51 are embedded in the damping materials 74, and the linear portion 51c of the S-shaped spring portion 51 is embedded in the damping material 75 described above. These damping materials 74 and 75 are, for example, obtained in a manner in which predetermined amounts of thermosetting silicon gel material having fluidity in an unhardened liquid state are injected and held in the concave portions and the clearance, and the spring assembly 30 is thereafter heated in an oven, for example, at 70° C. for 30 minutes, so that the unhardened gel material is hardened to form silicon gel material having a predetermined viscosity.

Accordingly, if the movable member 32 is rotated about the mirror rotation axis R, the end portions 51b and the linear portion 51c of the S-shaped spring portion 51 are deformed in the damping materials 74 and 75 thereby generating a predetermined damping force due to the viscosity resistance, so that the oscillation of the movable member 32 is damped.

When the unhardened damping materials 74 and 75 are injected and held, cohesion is effected such that the free surfaces are minimized by the surface tension. Accordingly, the liquid lump of the unhardened damping material 74 is held at a deep portion in the concave portion formed between a pair of projecting portions 71 and 72 and is held at a predetermined position with the end portion 51b embedded at the center portion. In addition, the liquid lump of the unhardened damping material 75 is held between the projecting portions 72 and 73 and is held such that the linear portion 51c of the S-shaped spring portion 51 is embedded in the center thereof.

The clearance formed between two surfaces of a pair of projecting portions 71 and 72 opposed to each other is formed as a damping material maintaining gap G for holding the damping material 74 as described above. In this case, since the damping material holding gap G is formed between a pair of projecting portions 71 and 72 formed on the fixed member 31, the damping material holding gap G can be formed in an arbitrary shape. Therefore, for example, as in the present embodiment, the damping holding gap G can be formed as a U-shaped concave portion having a back wall portion and the injected unhardened damping material can be directly held securely at a deep portion as described above, so that the damping material 74 can be securely held at a precise position. Note that the damping material holding gap G formed by the projecting portion 73 of the spring attachment portion 44 of the movable member 32 is the same as above.

In addition, a damping material holding gap G is also formed between the projecting portions 72 and 73, e.g., between these two opposed surfaces. In this case, these two surfaces are relatively moved and the S-shaped spring portion 51 is deformed, by rotation of the movable member 32. Therefore, the damping material 75 applies a damping force to both of the surfaces so that a much larger damping force can be obtained.

However, if the surfaces of the projecting portions 72 and 73 opposed to each other are parallel planes, the cross-sectional shape of the linear portion 51c is constant in the Z-axis direction and the free surface thereof does not change even when the liquid lump of the damping material 75 is moved in the lateral direction in FIG. 6, i.e., in the Z-direction in FIG. 5. Therefore, the liquid lump of the damping material 75 is movable to an arbitrary position in the Z-direction, and the holding position thereof is not constant. To prevent this drawback, in the present embodiment, convex portions 76, each of which continues in the X-axis direction and has a convex cross-section, are formed respectively on the surfaces of the projecting portions 72 and 73 which are opposed to each other. At the portion where these convex portions 76 are opposed to each other, the width of the damping material holding gap G is narrowed and a narrow portion N is thus formed. Accordingly, when the liquid lump of the damping material 75 moves in the Z-axis direction, a difference appears between the areas of the free surfaces in both sides, and the liquid lump moves to a position where the surface tensions of the free surfaces in both sides are balanced. The liquid lump is held stably at this position, i.e., at the narrow portion N. Therefore, it is possible to accurately hold the damping material 75 at a predetermined position.

Note that as the damping materials 74 and 75, it is possible to use arbitrary material having a damping characteristic, such as a ultraviolet-hardening silicon gel, acrylic gel, butyl rubber liquidized by a solvent, acrylic adhesion, or the like, other than the materials described above.

Next, explanation will be made of operation of an installation apparatus for attaching the galvano mirror 20 constructed as described above into the galvano mirror container section 28 of the carriage 2 and for installing the mirror at a predetermined position by adjusting the inclination thereof or the like, with reference to FIGS. 11 and 12.

Firstly, as described above, the spherical support surface 24 formed on the bottom surface of the base 22 of the galvano mirror 20 has a center axis S which is parallel to the mirror rotation axis R and is included in the reflection surface of the mirror 21. In addition, the center point of the spherical surface of the support surface 24 corresponds to the position O of the optical axis of the entering light on the reflection surface of the mirror 21. Also, the bearing seat surface 29 in form of a conical surface formed at the bottom portion of the galvano mirror container portion 28 of the carriage 2 has a center axis S', which is parallel to the mirror rotation axis R, is included in the reflection surface of the mirror 21, and passes through the position O of the optical axis of the entering light on the reflection surface of the mirror 21.

Further, as shown in FIG. 12, the galvano mirror 20 is held by a fitting tool 80. This fitting tool 80 has a lower end portion having an inverted U-shape, and for example, four positioning pins 81 are projected from the load bearing portions of the tool. In addition, an electromagnet not shown is included in the fitting tool 80.

This kind of fitting tool 80 is engaged closely with the galvano mirror 20 from upside, and the electromagnet is excited thereby to magnetically suction and hold the galvano mirror 20. In this case, the positioning pins 81 are inserted in the gaps formed in the rear side of the permanent magnets 39 and in the front side thereof, and the front and rear sides of the permanent magnets are clamped and held between the positioning pins 81. In this manner, the galvano mirror 20 is held positioned at a predetermined position with respect to the fitting tool 80.

Next, the galvano mirror held by the fitting tool 80 is inserted into the galvano mirror container section 28 from an upper end opening portion thereof. The inserting direction is a direction parallel to the mirror rotation axis R, i.e., the direction parallel to the center axis S of the support surface 24 and the center axis S' of the bearing seat surface 29. The galvano mirror 20 thus inserted is situated such that the support surface 24 is seated on the bearing seat surface 29 and the center axes S and S' correspond to each other.

In this state, the galvano mirror 20 is pressed downward with a predetermined pressure force of, for example, about 100 gf by a fitting tool 80 and the support surface 24 is kept in contact with the bearing seat surface 29. While making them slide on each other, the inclination of the galvano mirror 20 is inclined, for example, rotated about the mirror rotation axis R, i.e., about the Y-axis and the X-axis, thereby to adjust the inclination thereof about the Z-axis parallel to the reflection surface of the mirror 21 with respect to the optical axis of the optical system. Note that this adjustment is carried out by injecting light from the laser diode 11 into the mirror 21 of the galvano mirror 20, by detecting the inclination of light emitted from the fixed mirror 1b with respect to the reference surface of the carriage 2 by means of a auto-collimator, and by automatically controlling the fitting tool 80 by means of a control device not shown or the like.

Further, after the adjustment service as to the inclination as described above is completed, the galvano mirror 20 is maintained at the position, and an adhesive agent A is injected and hardened between the galvano mirror 20 and the inner surface of the galvano mirror container section 28, e.g., between the front edge portion and both side surface portions of the base member 22 and the inner surface of the galvano mirror container section 28, or between the support surface and the bearing seat surface 29. The galvano mirror 20 is thereby fixed at a predetermined installation position. Further, thereafter, the fitting tool 80 is pulled out upward.

Figure 13:
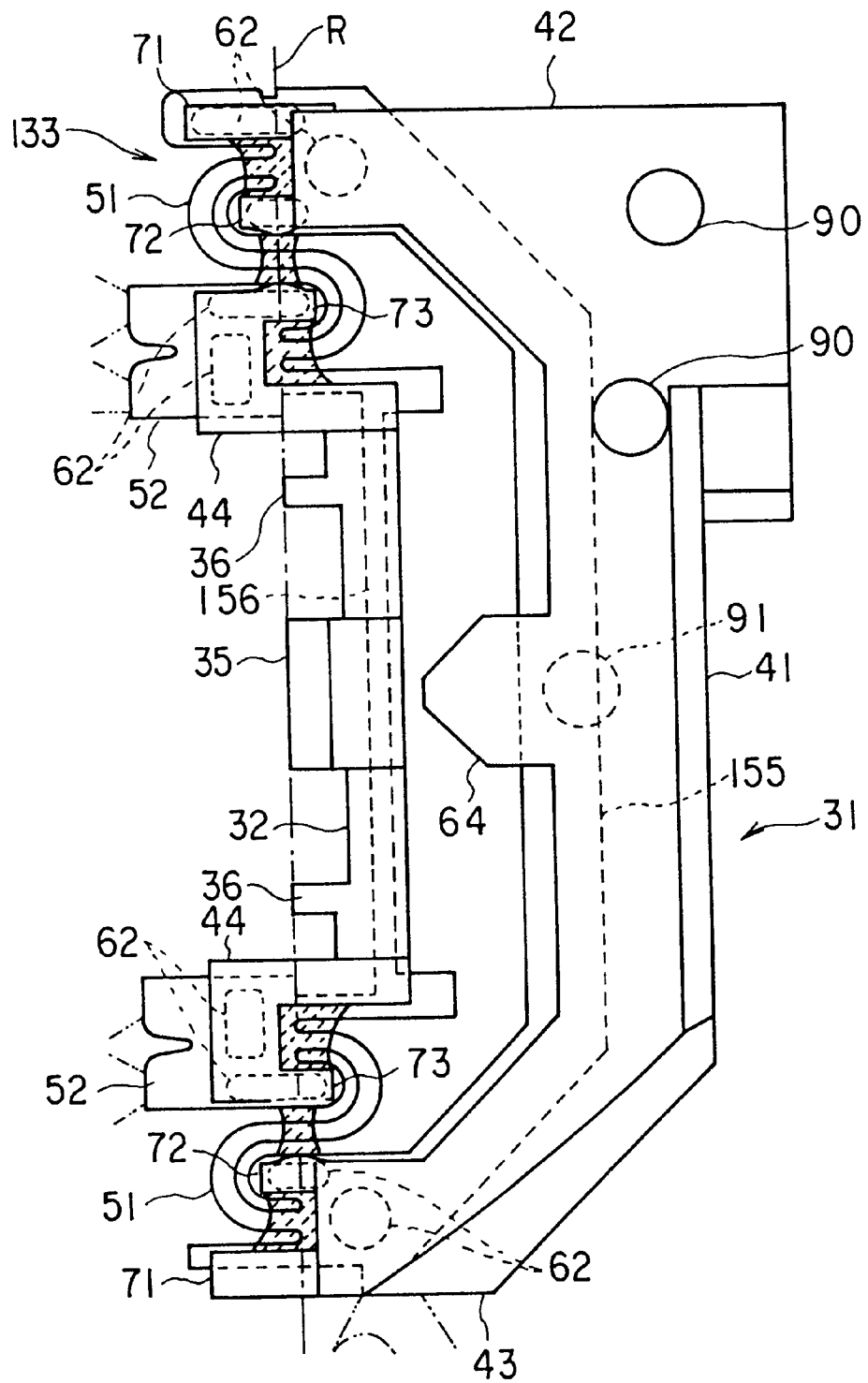
FIG. 13 is a side view of a supporting apparatus according to a second embodiment.

Note that the present invention is not limited to the first embodiment described above. Although the first embodiment uses two springs 33 and 34 which are let function also as conductive members, for example, these springs 33 and 34 need not be used as conductive members if an apparatus in which a permanent magnet is attached to the movable member 32 and a coil is provided in the side of the fixing member 31. Accordingly, it is possible to use a spring 133 in which the springs 33 and 34 are formed as a unit, like in the second embodiment shown in FIG. 13.

In the second embodiment, both S-shaped spring portions 51 are integrally connected by a continuous reinforcement portion 155 in the fixed side and a continuous reinforcement portion 156 in the movable side. Further, the reinforcement portion 155 is integrally embedded along the substantial center plane of the beam portion 41 of the fixing member 31 and the arm portions 42 and 43. In addition, the reinforcement portion 156 is also integrally embedded continuously along the substantial center plane in the movable member 32. In this kind of embodiment, the rigidity of the fixed member 31 and the movable member 32 is increased and undesired deformation thereof can be prevented effectively.

Note that this embodiment has the same structure as that of the first embodiment except for the point described above, and the portions in FIG. 13 that correspond to those of the first embodiment are referred to by same reference symbols and explanation thereof will be omitted herefrom.

Figure 15:
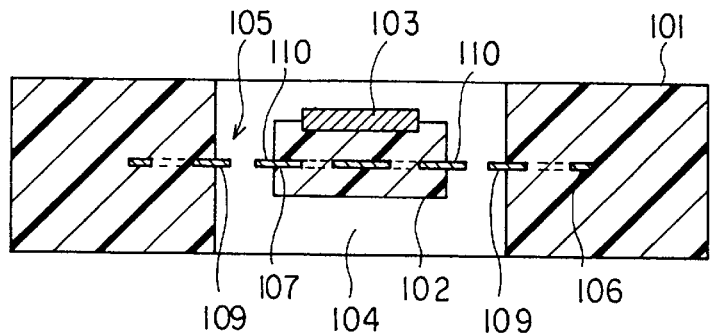
FIG. 15 is a cross-sectional view cut along a line 15—15 in FIG. 14.

FIGS. 14 and 15 show a third embodiment of the present invention which is a mirror supporting apparatus for a galvano mirror and comprises a frame-like fixed member. In the figures, the reference 101 denotes a frame-like fixed member which is formed of a synthetic resin material, for example. Further, a movable member container section 104 is formed at the center portion thereof. Further, a movable member 102 formed of a synthetic resin material is provided in the movable member container section 104, and a mirror 103 is attached to the movable member 102, for example.

Also, in the figures, the reference 105 denotes a spring for supporting the movable member 102. This spring 105 is integrally formed of a thin plate material made of a metal material such as beryllium-copper or the like and is comprised of a frame-like fixed-side attachment portion 106, a movable-side attachment portion 107, and S-shaped spring portions 108 which connects the attachment portions. Further, like in the first embodiment described above, the S-shaped spring portions 108 are deformed, thereby supporting the movable member to be rotatable.

Further, the fixed-side reinforcement portion 106 and the movable-side attachment portion 107 are integrally molded in the fixed member 101 and the movable member 102, respectively. The fixed-side reinforcement portion 106 and the movable-side attachment portion 107 of the spring 105 are arranged along the center plane of these members as shown in FIG. 15, i.e., along the fitting surface of metal molds in case where these members are formed of a synthetic resin material as in this case.

Note that edge portions 109 and 110 of a part of the fixed-side reinforcement portion 106 and the movable-side attachment portion 107 are projected from the side surfaces of the fixed member 101 and the movable member 102, and these edge portions 109 and 110 are pressed and fixed between fitting surfaces of metal molds thereby to prevent these fixed-side reinforcement portion 106 and the movable-side attachment portion 107 from being shifted in the metal molds, when injection-molding these member. In addition, through holes are formed in these fixed-side reinforcement portion 106 and the movable-side attachment portion 107, and a resin material is filled in the through holes 111 and 112, thereby connecting both side portions of the fixed-side reinforcement portion and the movable-side attachment portion 107.

In this embodiment, the fixed member 101 and the fixed-side reinforcement member 106 are formed in frame-like shapes and these components themselves have highly rigid and strong shapes. Therefore, the rigidity is high and the precision is also high.

Figure 16:
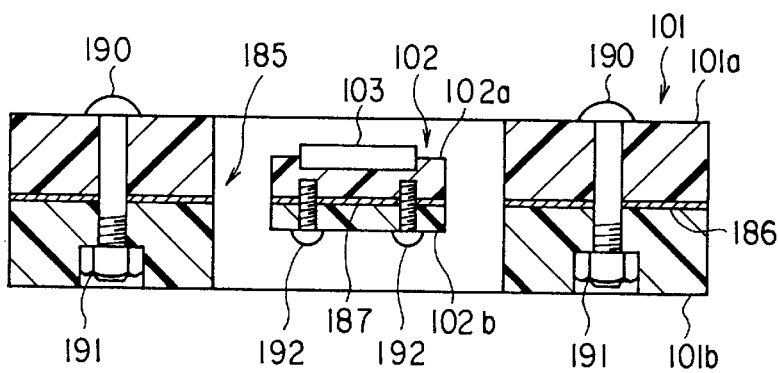
FIG. 16 is a cross-sectional view of a fourth embodiment, corresponding to FIG. 15.
Figure 17:
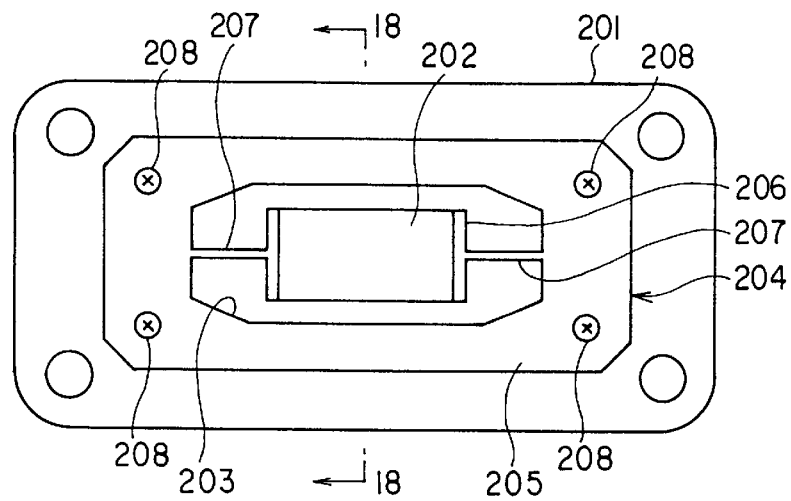
FIG. 17 is a side view of a conventional supporting apparatus.
Figure 18:
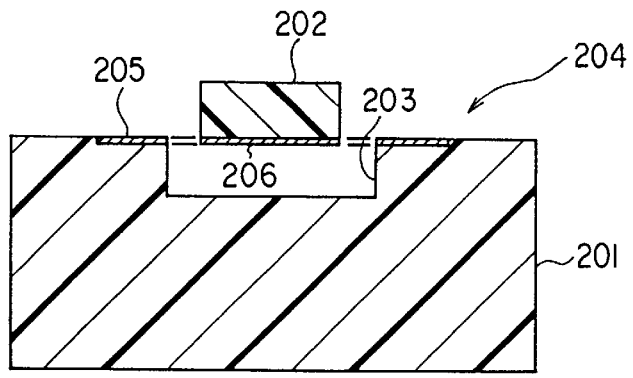
FIG. 18 is a cross-sectional view cut along a line 18—18 in FIG. 17.

FIG. 16 shows a fourth embodiment of the present invention. In this embodiment, each of the fixed member and the movable member is constructed by two parts, and the fixed-side reinforcement portion and the movable-side attachment portion are clamped and pressed therebetween achieving integration.

Specifically, the frame-like fixed member 101 and the movable member 102 are respectively formed of two fixed-member halves 101a and 101b and two movable-member halves 102a and 102b, which are separated at the center planes of the members 101 and 102. In addition, between these halves, a fixed-side reinforcement portion 106 and a movable-side reinforcement portion 187 have the same shapes and sizes as the fixed member 101 and the movable member 102.

Further, the fixed-side reinforcement portion 186 and the movable-side attachment portion 187 of the spring 185 are inserted between fitting surfaces of the fixed-member halves 101a and 101b of the fixed member 101 and the movable-member halves 102a and 102b of the movable member 102, i.e., at the center surface of the fixed member 101 and the movable member 102. Further, these components are tightened with screws 190 and 192 and nuts 191 or the like so that the spring 185 is fixed, clamped and pressed between those halves.

In this embodiment, the fixed member 101 and the movable member 102 are respectively formed of separate halves, and the spring 185 is fixed mechanically, clamped and pressed between the halves. Therefore, the materials of these fixed member 101 and the movable member 102 are not subjected to any limitations but these members may be made of a material such as ceramics, metal, or other arbitrary materials. In addition, these halves can be processed precisely by cutting so that the precision can be much more improved.

Note that the present invention is not limited to the above embodiments. For example, the attachment structure of the movable-side attachment portions and the movable member is not limited to that of the above embodiments but an arbitrary attachment structure may be adopted. In addition, the shapes of the fixed member, movable member, and spring are not limited to those described above.

Further, the present invention is not limited to an apparatus for supporting a mirror of a galvano mirror as described above but is applicable to an apparatus for movably or rotatably supporting any other optical element or component.

As has been described above, according to the present invention, the fixed member is reinforced and the rigidity thereof is increased by the fixed-side reinforcement portion of the spring which is integrated with the fixed member, so that undesired deformation caused by thermal expansion due to temperature changes, an external force during assembly, and the like is reduced and the support accuracy and the support characteristic of the spring are improved. In addition, since the fixed-side reinforcement portion is arranged and integrated along the substantial center plane of the fixed member, this fixed member has a symmetrical structure with respect to the center plane. Accordingly, deformation caused by temperature changes and external forces becomes also symmetrical and the fixed-side reinforcement portion is arranged at the center of the symmetrical deformation, so that the deformation of the fixed-side reinforcement portion itself is very small, thus achieving higher precision.

Note that a person in the art can add other improvements or modifications hitherto than described above. Therefore, more broadened embodiments of the present invention are not limited to the embodiments described above. Accordingly, various modifications can be made without deviating from the basic subject or concept of the present indicated by the claims.

What is claimed is:

1. A supporting apparatus for a movable portion of an optical system, comprising a fixed member, a movable member to which at least an optical element or component is attached, and a support mechanism for supporting the movable member such that the movable member can be displace with respect to the fixed member, wherein the support mechanism comprises a spring formed by forming a plate material into a shape, and the spring includes a spring portion which can be deformed to support movably or rotatably the movable member, a movable-side attachment portion formed to be continuous to an end portion of the spring, and a plate-like fixed-side reinforcement portion formed to be continuous to another end portion of the spring portion, and wherein the movable-side attachment portion is attached to the movable member, and the movable-side attachment portion is arranged along a substantial center plane of the movable member and is attached to be integral with the movable member.

2. A supporting apparatus for a movable portion of an optical system, according to claim 1, wherein
the fixed member is of a cantilever type, and the fixed-side reinforcement portion has an elongated shape elongated along a lengthwise direction of the fixed member and is arranged along the substantial center plane of the fixed member.

3. A supporting apparatus for a movable portion of an optical system, according to claim 1, wherein
the fixed member is of a frame type, and the fixed-side reinforcement portion has a frame-like shape and is arranged along the substantial center plane of the fixed member.

4. A supporting apparatus for a movable portion of an optical system, according to claim 1, wherein
the fixed member is formed of a synthetic resin material, and the fixed-side reinforcement portion is arranged along the substantial center plane of the fixed member and is molded integrally in the fixed member.

5. A supporting apparatus for a movable portion of an optical system, according to claim 1, wherein
the fixed member is constructed by a pair of fixed-member halves which fit each other on the substantial center plane of the fixed member, and the fixed-side reinforcement portion is clamped between the fixed-member halves to be integrally attached to the fixed-side halves.

6. A supporting apparatus for a movable portion of an optical system, according to claim 4, wherein
a through hole is formed in the fixed-side reinforcement portion, and a synthetic resin material is filled in these through holes, thereby connecting portions of the fixed member positioned in both sides of the fixed-side reinforcement portion.

7. A supporting apparatus for a movable portion of an optical system, according to claim 4, wherein
at least a part of an edge portion of the fixed-side reinforcement portion is projected from a side surface of the fixed member, and the projected edge portion is clamped and pressed between fitting surfaces of metal molds for injection-molding the fixed member.

8. A supporting apparatus for a movable portion of an optical system, according to claim 7, wherein
a connection rib arranged over the projected edge portion of the fixed-side reinforcement portion and connecting integrally portions of the fixed member in both sides of the fixed-side reinforcement portion is provided to be projected from the side surface of the fixed member.

9. A supporting apparatus for a movable portion of an optical system, according to claim 1, wherein said spring is formed in a generally S shape.

* * * * *